US008590271B2

(12) United States Patent  (10) Patent No.: US 8,590,271 B2
Thiagarajan et al.  (45) Date of Patent: Nov. 26, 2013

(54) MULTI-WALL STRUCTURAL COMPONENTS HAVING ENHANCED RADIATRANSMISSION CAPABILITY

(75) Inventors: Chinniah Thiagarajan, Karnataka (IN); Frans Adriaansen, Bergen Op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 1416 days.

(21) Appl. No.: 11/567,003

(22) Filed: Dec. 5, 2006

(65) Prior Publication Data

US 2007/0240370 A1    Oct. 18, 2007

Related U.S. Application Data

(63) Continuation-in-part of application No. 11/403,590, filed on Apr. 13, 2006, now Pat. No. 7,992,361.

(51) Int. Cl.
*E04C 2/54* (2006.01)
*E04C 1/42* (2006.01)

(52) U.S. Cl.
USPC ............. 52/783.1; 52/306; 52/307; 52/308; 47/17

(58) Field of Classification Search
USPC ........ 47/17; 52/200, 306–308, 783.1, 783.11, 52/783.14
See application file for complete search history.

(56) References Cited

U.S. PATENT DOCUMENTS

| 2,179,863 A | | 11/1939 | Rolph |
| 2,714,816 A | * | 8/1955 | Pennell ........................ 359/592 |
| 2,812,691 A | | 11/1957 | Boyd |
| 2,844,998 A | | 7/1958 | Vincent |
| 2,858,734 A | | 11/1958 | Boyd |
| 3,096,684 A | | 7/1963 | Kegg et al. |
| 3,274,315 A | | 9/1966 | Kawamura |
| 4,235,658 A | * | 11/1980 | Klingel et al. ........... 156/244.12 |
| 4,519,675 A | | 5/1985 | Bar-Yonah |
| 4,576,850 A | * | 3/1986 | Martens ........................ 428/156 |
| 4,586,297 A | | 5/1986 | Tagiasco |
| 4,671,025 A | | 6/1987 | Butler |
| 4,753,054 A | | 6/1988 | Butler |
| 5,052,164 A | | 10/1991 | Sandow |
| 5,104,732 A | * | 4/1992 | Patel ............................ 428/331 |
| 5,261,184 A | | 11/1993 | Appeldorn et al. |

(Continued)

FOREIGN PATENT DOCUMENTS

| DE | 2722817 A1 | 11/1978 |
| DE | 102004032357 A1 | 2/2006 |
| WO | 9942861 | 8/1999 |
| WO | 2005066552 A1 | 7/2005 |

OTHER PUBLICATIONS

Matthais Geissler et al.; "Patterning Principles and Some New Developments"; Advanced Materials; 2004, 16, No. 15; pp. 1249-1269.

(Continued)

*Primary Examiner* — James Buckle, Jr.
(74) *Attorney, Agent, or Firm* — Cantor Colburn LLP

(57) ABSTRACT

Disclosed herein is a hollow multi-wall structural component comprising a plurality of spaced-apart sheets that transmit an incident radiation, and connected with reinforcing members; wherein at least a portion of one surface of at least one of the sheets comprises a plurality of radiation transmission-enhancing elements. Methods for forming the hollow multi-wall structural component are also described.

26 Claims, 7 Drawing Sheets

(56) References Cited

U.S. PATENT DOCUMENTS

| | | | |
|---|---|---|---|
| 5,658,644 A | 8/1997 | Ho et al. | |
| 5,870,233 A | 2/1999 | Benz et al. | |
| 6,191,890 B1* | 2/2001 | Baets et al. | 359/572 |
| 6,377,406 B1 | 4/2002 | Hofmann | |
| 6,898,902 B1 | 5/2005 | Stoffers et al. | |
| 6,908,202 B2 | 6/2005 | Graf et al. | |
| 6,959,519 B2* | 11/2005 | Adriaansen | 52/537 |
| 2002/0197449 A1 | 12/2002 | Mende et al. | |
| 2003/0066638 A1 | 4/2003 | Qu et al. | |
| 2003/0108716 A1* | 6/2003 | Nun et al. | 428/141 |
| 2003/0207082 A1 | 11/2003 | Maas et al. | |
| 2003/0214070 A1 | 11/2003 | Goossens et al. | |
| 2003/0233796 A1 | 12/2003 | Walz et al. | |
| 2004/0159054 A1 | 8/2004 | Adriaansen et al. | |
| 2004/0177582 A1 | 9/2004 | Adriaansen | |
| 2004/0191485 A1* | 9/2004 | Groothues et al. | 428/166 |
| 2004/0257659 A1 | 12/2004 | Watanabe | |
| 2005/0112331 A1 | 5/2005 | Donea et al. | |

OTHER PUBLICATIONS

German Patent No. 102004032357; Publication Date: Feb. 9, 2006; Abstract Only; 1 page.

International Search Report; International Application No. PCT/US2007/082543; International Filing Date Oct. 25, 2007; Date of Mailing Feb. 27, 2008, 4 pages.

Written Opinion of the International Searching Authority; International Application No. PCT/US2007/082543; International Filing Date Oct. 25, 2007; Date of Mailing Feb. 27, 2008; 6 pages.

Younan Xia et al.; "Soft Lithography", Angew. Chem. Int. Ed. 1998, 37; pp. 550-575.

Leonid I. Goray et al.; "Efficiencies of Master, Replica, and Multilayer Gratings for the Soft-X-Ray-Extreme-Ultraviolet Range: Modeling Based on the Modified Integral Method and Comparisons with Measurements"; Applied Optics, vol. 41, (2002) No. 7; pp. 4134-1445.

* cited by examiner

MULTI-WALL STRUCTURAL COMPONENTS HAVING ENHANCED RADIATRANSMISSION CAPABILITY

CROSS REFERENCE TO RELATED APPLICATIONS

This application is a Continuation-In-Part of U.S. patent application Ser. No. 11/403,590, entitled "POLYMER PANELS AND METHODS FOR MAKING THE SAME", filed Apr. 13, 2006 now U.S. Pat. No. 7,992,361, which is herein incorporated by reference.

BACKGROUND

The invention relates generally to multi-wall structural components that are capable of enhancing the transmission of incident radiation. Further, the invention relates to methods for forming the multi-wall structural components.

Various types of plastic sheet structures made of plastics, such as polycarbonate or acrylic resins are known and commercially available. Such sheets can be obtained in a transparent or a translucent form for use in a variety of applications. The transparent or translucent plastic sheets have been combined in different ways to form multi-wall sheet structures that are used for applications, such as for roof, window, vertical wall glazing, and the like, where there is a need for light to be transmitted. In general, when radiation falls on a surface, some combination of reflection, transmission, and absorption occurs. When visible light falls on a plastic surface, the absorption of the light by the plastic is negligible and therefore only reflection and transmission modes are considered. Therefore, if "R" denotes the percentage of amplitude of the electric vector in the reflected light, the percentage of amplitude of the electric vector in the transmitted light will essentially be (100-R). The reflection of visible light incident on a transparent surface can be given by Equation 1:

$$R/E = (n \cos \phi' - \cos \phi)/(n \cos \phi' + \cos \phi) \quad \text{(Equation 1)}$$

wherein "R" denote the amplitude of the electric vector in the reflected light, "n" is the refractive index of the transparent medium, "$\phi$" is the angle of incidence, and $\phi'$ is the angle of refraction. "E" denotes the amplitude of the electric vector in the incident light. At normal incidence, $\phi$ and $\phi'$ become zero, and therefore the transmittance is given by Equation 2:

$$R^2/(E)^2 = ((n-1)/(n+1))^2 \quad \text{(Equation 2)}$$

wherein "R", "E", and "n" are as described previously. For normal incident light, it follows from Equation 2 that for a glass surface having a refractive index of 1.5, the value of reflectance at an air/glass interface is 0.08, or 8 percent of such incident light gets reflected. Typically, when solar radiation interacts with a plastic sheet at normal incidence, up to around 88 percent of light can be reflected due to air/plastic refractive index mismatch. This determines the maximum entitlement for transmission through the plastic sheet. In a multi-wall plastic sheet structure, since there is a plurality of air/plastic interfaces, the efficiency of light transmission is further reduced. It has been estimated that if light transmission through a multi-wall sheet structure, such as for example, a green house roof can be increased by around 1 percent, the yield of the green house increases by around 5 percent. Further, in the case of industrial roofing, enhanced light transmission helps in daylight energy savings.

Therefore, there is a need for multi-wall sheet structures that not only have superior structural stiffness, but can also transmit an enhanced amount of an incident radiation, such as electromagnetic radiation or visible radiation.

BRIEF DESCRIPTION

In one aspect, a hollow multi-wall structural component comprising a plurality of spaced-apart sheets that transmit an incident radiation is disclosed. The sheets are connected with reinforcing members; wherein at least a portion of one surface of at least one of the sheets comprises a plurality of radiation transmission-enhancing elements.

In another aspect, a glazing structure comprising a hollow multi-wall structural component is disclosed. The glazing structure comprises a plurality of spaced-apart plastic sheets that transmit visible light, and bonded with reinforcing members. At least one surface of at least one of the sheets comprises a plurality of radiation transmission-enhancing nanostructured elements.

In yet another aspect, a method for increasing radiation transmission through a hollow multi-wall structural component is disclosed. The method comprises forming radiation transmission-enhancing structures on at least a portion of one surface of at least one of a plurality of spaced-apart sheets of a hollow multi-wall sheet structure; wherein the sheets are connected with reinforcing members.

DRAWINGS

These and other features, aspects, and advantages of the present invention will become better understood when the following detailed description is read with reference to the accompanying drawings in which like characters represent like parts throughout the drawings, wherein.

Figure 9:
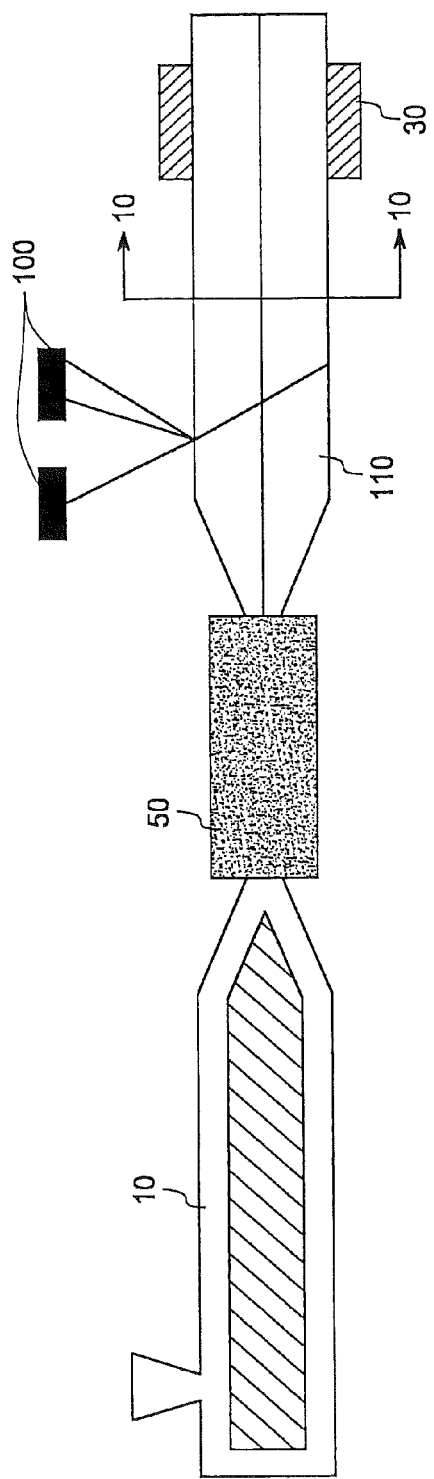
Figure 10:
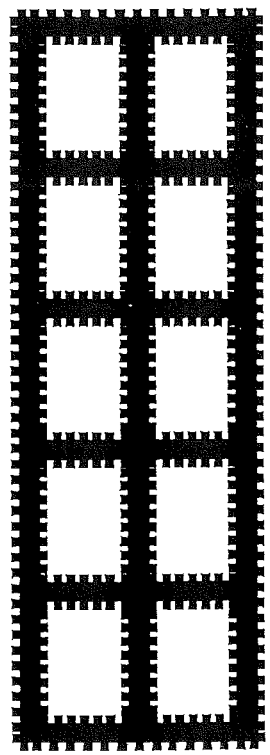
Figure 11:
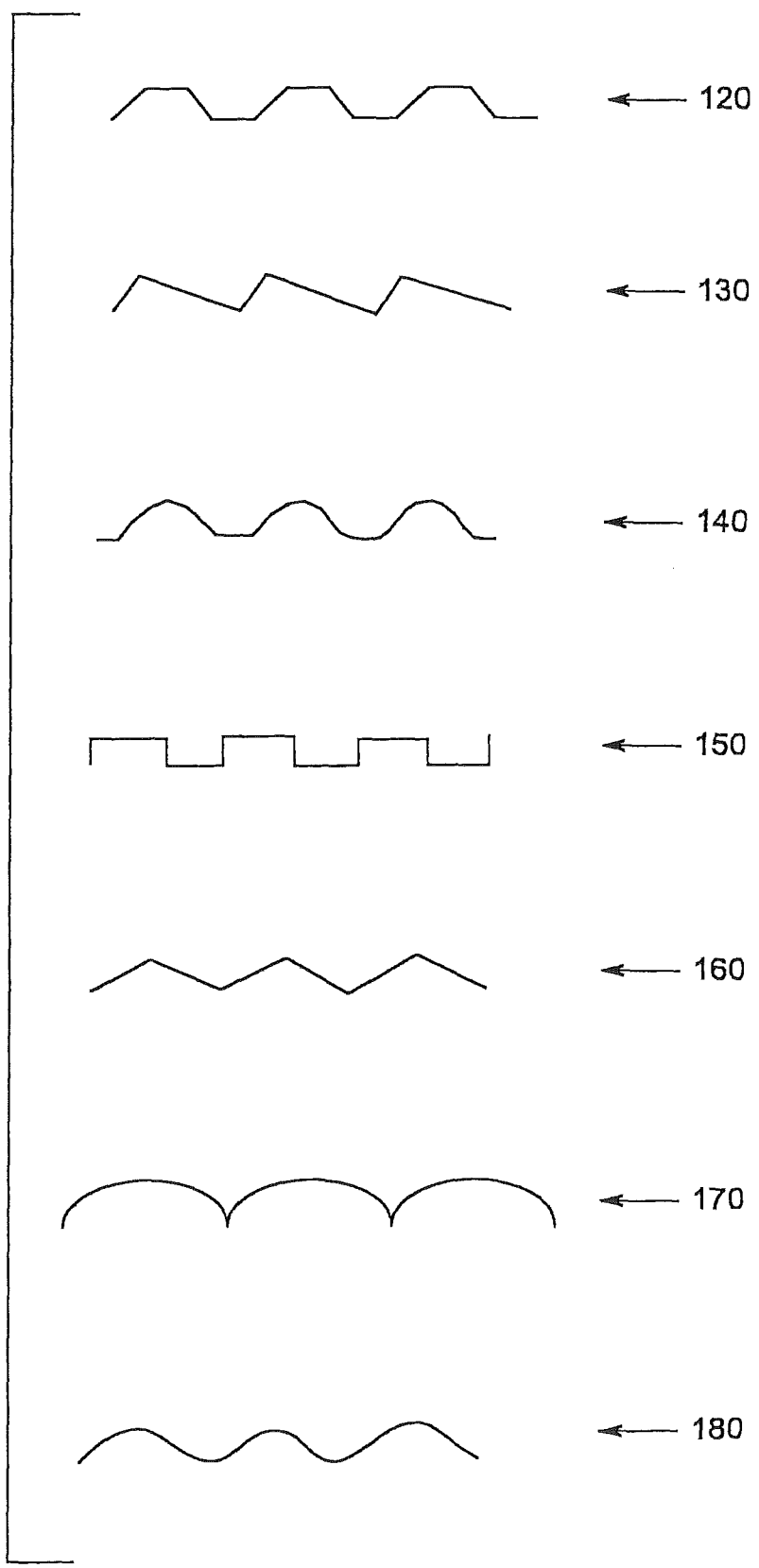
Figure 12:
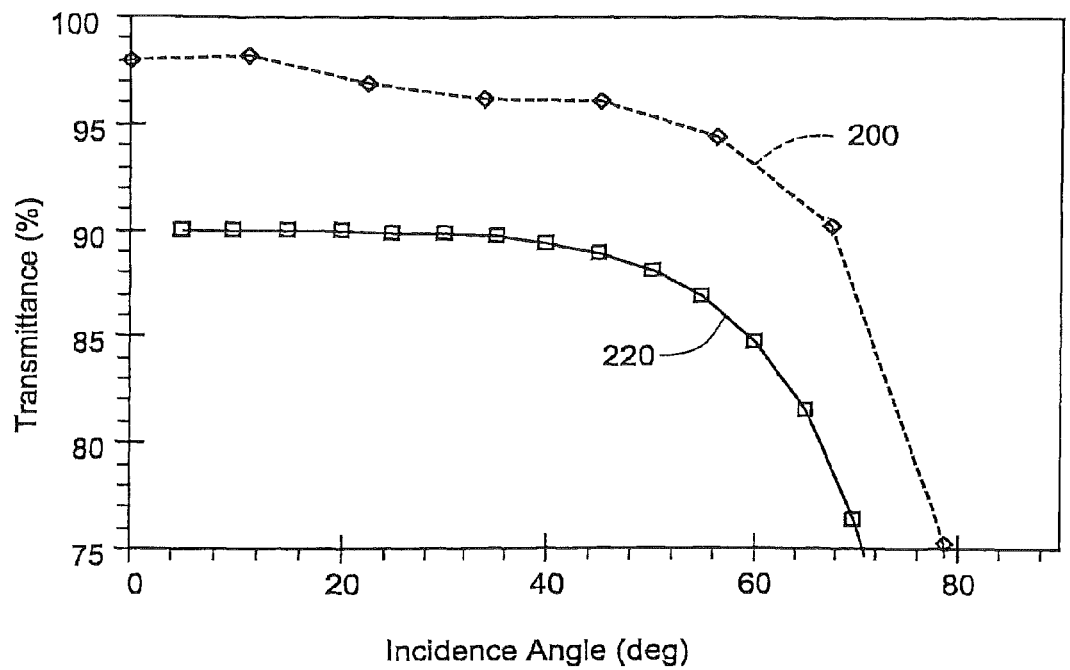
Figure 13:
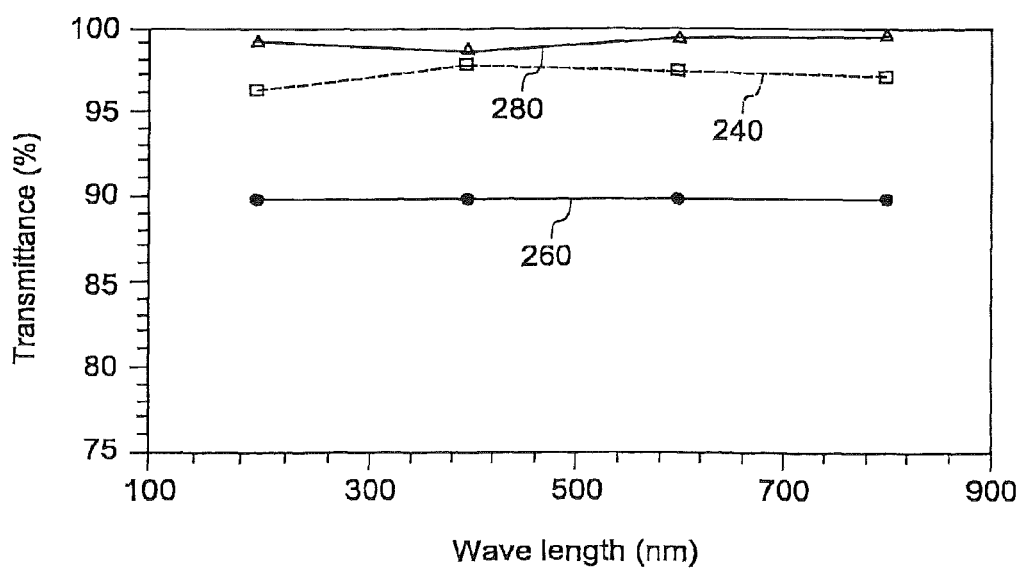

FIG. 9 represents a schematic for a 2-step process comprising forming a hollow multi-wall sheet using a die, and then scanning vertically with a focused beam of an engraving radiation to engrave a plurality of radiation transmission enhancing elements on a plurality of surfaces of the hollow multi-wall sheet to produce a hollow multi-wall structural component having the plurality of radiation transmission enhancing elements;

FIG. 10 represents a cross-sectional view along line 10-10 of the hollow multi-wall structural component of FIG. 9 in a direction perpendicular to the line of extrusion;

FIG. 11 represents variously shaped structures as exemplary radiation transmission enhancing elements that can be used in the hollow multi-wall sheet structures disclosed herein;

FIG. 12 represents two plots of percent light transmittance as a function of the angle of incident light having a wavelength of 500 nanometers for a surface having triangular-shaped 200 and no radiation transmission enhancing elements 220, respectively; and FIG. 13 represents three plots of percent light transmittance as a function of the wavelength of incident light for surfaces having triangular-shaped shaped 280, lamellar-shaped 240, and no radiation transmission enhancing elements 260, respectively.

Figure 14:
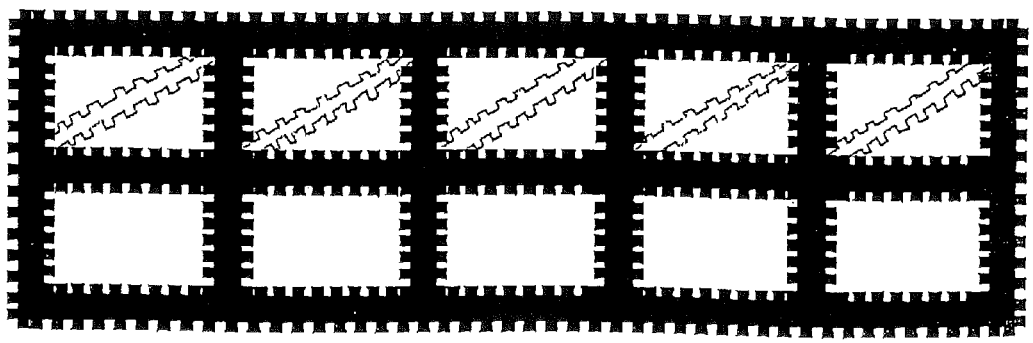

FIG. 14 represents a view of a glazing structure where the reinforcing members comprise perpendicular and angled ribs.

DETAILED DESCRIPTION

Various types of extruded sheet structures prepared from thermoplastic resins are known and commercially available. Thermoplastic resins, such as polycarbonates and acrylic resins have been used for producing transparent or translucent sheets. Extruding a thermoplastic resin by using a suitable mold or die generally produces a multi-wall sheet (MWS) or multi-wall sheet structures (MWSS). The MWSS generally comprises two or more horizontal layers of the sheets spaced apart, where the sheets are extruded, held together, bonded, or connected with various types of reinforcing structures, variously called as ribs, struts, slats, webs, and the like. The overall thickness of a MWSS is determined in part by the number of horizontal sheets, the thickness of each sheet, and the dimensions of the reinforcing structures holding the sheets together. Such a MWSS is also sometimes referred to as a hollow multi-wall sheet structure (HMWSS) due to the presence of air gaps in the portions containing the reinforcing structures.

When the HMWSS is viewed along the plane of the horizontal sheets (i.e., along the cross-section relative to the direction of extrusion), various types of patterns, also sometimes called "cell patterns" (example, squares, rectangles, triangles, and trapezoids) formed by the vertical or vertically oriented reinforcing structures separating the horizontal sheets can be seen.

Various types of reinforcing structures can be used. For example, vertical, horizontal, or angled ribs, or various combinations of the foregoing ribs can be used as reinforcing structures. One example of an angled rib is a diagonal rib. Perpendicular ribs provide good mechanical properties by resisting flexing when a compressive force is applied in a direction perpendicular to the direction of extrusion (i.e., on horizontal surface of the sheets). Inclusion of angled ribs, such as diagonal ribs between the perpendicular ribs improves flexural rigidity and torsional rigidity. In an embodiment, the diagonal ribs can be present in every rectangular or square cell. In another embodiment, the diagonal ribs can be present in every alternate rectangular cell. Other periodic placements of the diagonal ribs can also be used depending upon the specific end-use application. The HMWSSs also have good thermal insulation properties. The presence of the cellular structure, created by the combination of the horizontal sheets and the vertically oriented reinforcing structures, produces numerous air gaps that help improve the insulation performance.

The HMWSSs described herein are used in a variety of applications. For example, they are used in the commercial and residential construction area as glazings for roofs, skylights, and windows where a combination of mechanical strength, light transmission, and thermal insulation is required. The HMWSSs can be used on a vertical or horizontal surface, or a sloping surface having any slope; and are particularly effective for withstanding stress forces created by natural phenomena such as wind and buildup of ice/snow. The thermal insulation property of the HMWSS is useful for climate control applications.

However, as indicated previously, there is a need for an improved HMWSS that is capable of enhancing the transmission of incident radiation. Accordingly, in one aspect of the present disclosure, a hollow multi-wall structural component comprises a plurality of spaced-apart sheets that are transparent to an incident radiation, and connected with reinforcing members; wherein at least a portion of one surface of at least one of the sheets comprises a plurality of radiation transmission-enhancing elements (hereinafter sometimes abbreviated as "RTEE"). The term "hollow multi-wall structural component", represented by the abbreviation "HMWSC" refers to a hollow multi-wall sheet having a plurality of the RTEEs on at least a portion of one surface of at least one of the sheets.

When visible light is incident on an air/transparent surface interface, where the transparent surface comprises nanometer-sized surface irregularities of a transparent coating or corrugations that are smaller than the wavelength of the incident visible light. The wave effects of small features induce constructive or destructive interference. When the size of the features are comparable in size to the wavelength of the incident light (radiation), destructive interference allows transmission of the incident radiation. When the feature size is much smaller than the wavelength of the incident light (radiation), the zeroeth order diffraction grating plays a role. The features form a graded refractive index instead of a sharp gradient. These features help to remove the sharp boundary, and thus the radiation does not see the refractive index mismatch. The surface irregularities can comprise pores or bumps or fibrous protrusions. As a result, the amount of transmitted light is enhanced, and the amount of reflected light produced by hemispherical reflectance is reduced. Such a phenomenon is also termed as "Anti-reflection". In the absence of such nanometer-sized structures, typically less than 90 percent of the incident light is transmitted through the glass surface. In the nanometer-sized structure regime, the effective refractive index ($n_{\it{eff}}$) of the medium is reduced such that it approaches the refractive index of air, which is close to that for vacuum, and for all practical purpose can be taken as 1. Under these conditions, the transparent surface essentially transmits all of the incident visible light. Mathematically, $n_{\it{eff}}$ is expressed by Equation 3:

$$n_{\it{eff}} = (n_a * n_s)^{0.5} \qquad \text{(Equation 3)}$$

wherein $n_a$ and $n_s$ denote the refractive index of air and the transparent substrate, respectively, at a given wavelength. Therefore, it follows that when the surface of a transparent substrate is modified such that $n_a$ is equal to or very close to $n_s$, the effective refractive index at a given wavelength will be one, or very close to one, respectively. A similar enhancement in transmission of visible light is seen when a transparent glass surface is covered with microscopic corrugations that are smaller than the wavelength of the incident light. This surface profile is popularly known as the "moth-eye" antireflective surface, since it has been earlier hypothesized that the array of sub-wavelength protuberances covering the eyes of night-flying moths served to reduce the reflectivity of the eyes (and thereby increase the transmission of light through the eyes) of these moths making them less detectable to predators.

The concepts explained above are applied to a HMWSC wherein at least a portion of one surface of at least one of the sheets comprises a plurality of RTEEs whose dimensions are less than the wavelength of an incident radiation. Therefore, the HMWSCs disclosed herein not only have superior mechanical properties characteristic of a multi-wall sheet structure, but also have superior radiation transmission capability. The enhanced radiation transmission capability is a result of the interaction of the incident radiation with the RTEEs, which can be generally regarded as sub-wavelength gratings. Further, nano-structured RTEEs can be engineered to achieve almost quantitative radiation transmission by leveraging diffractive optics for self-interference using zeroeth order gratings.

In an embodiment, the RTEEs have a size and a spacing periodicity on the surface of the sheet that is less than the average wavelength of at least a part of the incident radiation. In another embodiment, the RTEEs have a size and a spacing periodicity on the surface of the sheet that is from about one fourth to about one half of the average wavelength of at least a part of the incident radiation. In still another embodiment, the RTEEs have a size and a spacing periodicity, or an aspect ratio that is between 0.1 times to 100 times the wavelength of at least a part of the incident radiation. The term "average wavelength" is given by the average of all the wavelengths present in the portion of interest in the incident radiation. Various types of radiation of practically any wavelength can be used with the HMWSCs disclosed herein. In an embodiment, the incident radiation comprises electromagnetic radiation. The term "electromagnetic radiation" is herein defined as any light radiation having any magnitude of wavelength. In another embodiment, the incident radiation comprises infrared radiation, such as for example, having a wavelength from about 3000 nanometers to about 800 nanometers. In still another embodiment, the incident radiation comprises microwave radiation. Further the incident radiation may comprise one or more radiation wavelengths in the visible, infrared, or microwave range. In a particular embodiment, the incident radiation comprises light in the visible portion of the electromagnetic spectrum, such as for example, visible light that is normally sensed by the human eye. Thus in other embodiments, the incident radiation comprises visible light having a wavelength in the range from about 250 nanometers to about 800 nanometers, and from about 400 nanometers to about 700 nanometers. In still other embodiments, the HMWSCs disclosed herein can also be used with incident radiation having a wavelength of the order of centimeters or meters. Incident radiation comprising one or more sub-ranges of wavelengths as exemplified above can also be used. In such cases, the size of the RTEEs can be chosen to selectively enhance the transmission of a particular wavelength or range of wavelengths relative to other wavelengths present in the incident radiation.

RTEEs can be classified by size relative to the wavelength of the incident radiation. Thus, as defined herein, a nano-structured RTEE has a size less than the wavelength of the incident radiation, a micro-structured RTEE has a size about equal to the wavelength of the incident radiation, and a macro-structured RTEE has a size greater than the wavelength of the incident radiation. In an embodiment, with nano-structured RTEEs, transmission enhancement can be achieved with zeroeth order grating. In another embodiment, with micro-structured RTEEs, transmission enhancement can be achieved by using techniques to effect diffractive interference. In still another embodiment, with macro-structured RTEEs, transmission enhancement can be achieved using techniques that can afford quarter wave plate interference.

In an embodiment, the RTEEs are selected from the group consisting of nano-structured elements, micro-structured elements, and macro-structured elements. Further, the RTEEs can be in the form of protuberances (such as convex structures) or indentations (such as concave structures). The aspect ratio (length to width) of these protuberances can be from 0.1 to 100. The RTEEs can be of various heights or depths, and can be situated at various pitch values on a surface of the HMWSC. The term "pitch" herein means the distance or average distance between any two adjacent RTEEs. When nano-structured RTEEs are used to enhance transmission of visible light, the nano-structured RTEEs have a depth from about 100 nanometers to about 1000 nanometers in one embodiment, and from about 200 nanometers to about 800 nanometers in another embodiment. In still other embodiment, the nano-structured RTEEs can be spaced apart from each other at a distance from about 200 nanometers to about 1000 nanometers, and from about 200 to about 800 nanometers.

Various types of shapes of RTEEs can be used. In an embodiment, the RTEEs comprise at least one set of lamellar-shaped elements, triangular-shaped elements, pyramidal-shaped elements, cylindrical-shaped elements, conical-shaped elements, cubical-shaped elements, trapezoidal-shaped elements, sinusoidal-shaped elements, saw tooth-shaped elements, abs(sin)-shaped elements, cycloid-shaped elements, fiber shaped elements and combinations there of. FIG. 11 illustrates some of the shapes the RTEEs can take, such as trapezoidal-shaped RTEEs 120, saw tooth-shaped RTEEs 130, sinusoidal-shaped RTEEs 140, lamellar-shaped RTEEs 150, triangular-shaped RTEEs 160, abs(sin)-shaped RTEEs 170, and cycloid-shaped RTEEs 180.

The RTEEs can be situated on a surface receiving incident radiation in many different ways. Thus, the arrangement of the RTEEs may comprise periodic arrays, randomized arrays, quasi-periodic arrays, and randomized quasi-periodic arrays. Examples of periodic arrays include square periodic arrays and hexagonal periodic arrays. A randomized quasi-periodic array of RTEEs is known to significantly reduce the diffraction of light, especially in the lower wavelength range of visible light and for high angles of incidence. These types of features can offset any manufacturing defects, such as for example, size variations or shape variations that may arise during the production of the RTEEs.

The nano-structured elements are used as RTEEs to enhance the transmission of visible light or other types of radiation through one or more visible light-transparent plastic sheets of a HMWSC. The HMWSC offers an opportunity for making a variety of high performance articles, such as a building roof, a wall, a glazing, an automobile glazing, a wind shield, a display diffuser, a light enhancing element, a signage board, a green house roof, a stadium roof, a window, a skylight, a vehicular roof or glazing, a solar chimney, a light diffusing article, or a telecommunication component. Light diffusing articles include the diffusers used in display devices, such as lighting fixtures, signage, and screens for projection television or video monitors. They are also suitable for use in various displays of word processors, computers, and television, surfaces of light enhancement and diffuser plates used in liquid crystal displays, optical lenses, such as sunglass lenses of transparent plastics, lenses of eyeglasses, finder lenses for cameras, covers for various instruments, and surfaces of window glasses of buildings, automobiles, and electric railcars; curve mirrors, back mirrors, goggles, displays of personal computers, and word processors; and other various commercial displays.

For the green house roof application, the HMWSC can be used to selectively control the intensity of light incident on the plants and the temperature inside the green house. Additionally, the HMWSC may be modified in various ways so as to allow visible light and reflect far infrared radiation. Further, the HMWSC may comprise suitable additives to make them more robust for practical use, such as additives to resist degradation due to ultraviolet radiation from solar radiation, and additives to make them more weatherable. Furthermore, the base plastic material used for making the HMWSC may be such that it has a suitable coefficient of thermal expansion to be effective as a green house roofing material. The HMWSC combines the desirable attributes of the low cost of plastic material, low material weight, good mechanical properties (such as tensile strength, flexural modulus, rigidity, and the like), good thermal insulation, and enhanced radiation transmission ability due to the RTEEs. The roof covering material can be made of any material, such as thermoplastics. Exemplary materials include polyolefins, such as polyethylene, polypropylene, and the like; polycarbonate, polyesters, polyacrylates, such as poly(methyl acrylate) and poly(methyl methacrylate); and polyarylates. In a particular embodiment, polycarbonates prepared from bisphenol A, either as a monomer or a comonomer are useful for producing green house roofing due to their good mechanical properties and high optical clarity. For example, a bisphenol A homopolycarbonate that has an optical transmission of up to about 92 percent can be used. Thus, a polycarbonate HMWSC having tough impact strength to withstand hail, thermal insulation comparable to that of insulated glass, protection against UV-induced degradation, and durable weatherability and optical transmission can be produced using the techniques described herein. In other embodiments, the HMWSC can comprise a twin wall configuration or a triple wall configuration, each of which configurations can independently comprise a total thickness of about 5 millimeters to about 100 millimeters, or from 10 millimeters to about 60 millimeters. The wall thickness of each of the sheets making up the HMWSC can be from 0.1 millimeter to 15 millimeters. Such configurations can also be used for producing green house roofing. Further, the green housing roofing can be configured such that it is self-supporting, thus minimizing the requirements for a frame structure.

In an extension of the concepts outlined hereinabove, the HMWSC can be modified so as to orient the sheet to further enhance light transmission. Further, a variety of modifications can be carried out to further enhance the utility of the HMWSCs. Thus, for example, the plastic material may comprise an additive that converts UV light into visible light to enhance the amount of transmitted visible light. In other embodiments, the plastic material may comprise a multilayer coating to further enhance light transmission; a coating that facilitates self-cleaning of the surfaces (external or internal), a coating that prevents or minimizes condensation of moisture or other materials on the surfaces, or a coating that prevents deposition of biological material, such as proteins, algae, and the like. More than one type of the aforesaid coatings may be used to further enhance the functionality of the HMWSC. The HMWSCs may also form part of a photovoltaic device or any device where radiation is converted into electrical power, by increasing the amount of transmitted radiation incident upon the photosensitive material, thereby leading to increased generation of electricity.

Turning our attention to the reinforcing elements comprising the HMWSCs, a variety of arrangements of the reinforcing elements known in the art can be used. For example, depending upon the nature of the desired end-use application, the proper number of vertical and horizontal ribs can be arrived at for an optimum HMWSC. A variety of different materials can be used for producing the HMWSCs disclosed herein. In an embodiment, the sheets and the reinforcing members independently comprise a transparent material comprising a polymer or a plastic, a glass, a ceramic, a transparent metal, or silicon. Since silicon is known to be transparent to infrared radiation, the use of RTEEs of an appropriate size and periodicity that is comparable to the wavelength of the incident infrared radiation can be used for enhanced transmittance of the infrared radiation. Polymeric materials are particularly used for forming commercially useful HMWSCs. The polymeric sheets and the reinforcing members can independently comprise an acrylic resin, a polycarbonate, a polyolefin, a polyester, or a polyvinyl chloride. Examples of acrylic resins include poly(methylacrylate) and poly(methylmethacrylate). Polycarbonates are particularly useful since they have high toughness, excellent transparency, and good moldability.

Another aspect of the present disclosure is a glazing structure comprising a hollow multi-wall structural component. The glazing structure comprises a plurality of spaced-apart plastic sheets that are transparent to visible light, and bonded with reinforcing members; wherein at least one surface of at least one of the sheets comprises a plurality of radiation transmission-enhancing nano-structured elements. Such a glazing structure is valuable for producing a green house roof, a stadium roof, a window, a skylight, a vehicular body, a vehicular roof or glazing, a solar chimney, a signboard, or a telecommunication component. In all these cases, thermal insulation can also be realized due to the presence of the cellular structure created by the mesh of the vertically oriented reinforcing structures and the horizontal sheet surfaces.

The plastic sheets and the reinforcing members independently comprise thermoplastic polymers. Thermoplastic polymers that may be used are oligomers, polymers, ionomers, dendrimers, copolymers such as block copolymers, graft copolymers, star block copolymers, random copolymers, or the like, or combinations comprising at least one of the foregoing polymers. Suitable examples of thermoplastic polymers that can be used as the first and the second sheet are polyacetals, polyacrylics, polycarbonates polystyrenes, polyesters, polyamides, polyamideimides, polyarylates, polyarylsulfones, polyethersulfones, polyphenylene sulfides, polysulfones, polyimides, polyetherimides, polytetrafluoroethylenes, polytherketones, polyether etherketones, polyether ketone ketones, polybenzoxazoles, polyoxadiazoles, polybenzothiazinophenothiazines, polybenzothiazoles, polyp yrazinoquinoxalines, polyp yromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, or the like, or combinations comprising at least one of the foregoing thermoplastic polymers. In an embodiment, the plastic sheets and the reinforcing members independently comprise an acrylic resin, a polycarbonate, a polyolefin, a polyester, or a polyvinyl chloride. The polycarbonate resin for use is generally obtained from a dihydric phenol and a carbonate precursor by an interfacial polycondensation method or a melt polymerization method. Typical examples of the dihydric phenol include those disclosed in U.S. Patent Application No. 20030207082A1, which was published on Nov. 6, 2003, which is incorporated by reference herein in its entirety. In a particular embodiment, polycarbonates produced from 2,2-bis(4-hydroxyphenyl)alkanes and/or bisphenol A are useful for producing the HMWSS disclosed herein.

Blends of thermoplastic polymers may also be used. Examples of blends of thermoplastic polymers include those materials disclosed in U.S. Patent Application No. 20050112331A1, which was published on May 26, 2005, which is incorporated by reference herein in its entirety.

The thermoplastic polymers used in the HMWSCs may also contain thermosetting polymers if desired. Examples of thermosetting polymers are polyurethanes, natural rubber, synthetic rubber, epoxy, phenolic, polyesters, polyamides, silicones, and the like, and mixtures comprising any one of the foregoing thermosetting polymers.

The molding composition used for forming the HMWSC may also comprise one or more fire-retardant agents admixed therewith. Any of the fire-retardants known in the art for producing molding transparent compositions transparent to incident radiation, such as for example, visible light may be used. Other additives such as antioxidants, anti-drip agents, anti-ozonants, thermal stabilizers, anti-corrosion additives, impact modifiers, ultra violet (UV) absorbers, mold release agents, fillers, anti-static agents, flow promoters, impact modifiers, pigments, dyes, and the like, such as, for example, disclosed in U.S. Patent Application No. 20050112331A1, published on May 26, 2005, which is incorporated by reference herein in its entirety, may also be added in the amounts desired.

The thickness of the HMWS without the RTEEs can be about 1 to about 100 millimeters. In one embodiment, the thickness of the HMWS can be about 5 to about 100 millimeters. In other embodiments, the thickness of the HMWS can be about 10 to about 60 millimeters, and from about 2 to about 20 millimeters. In yet another embodiment, the thickness of the HMWS can be about 2.5 to about 15 millimeters. The spacing between the ribs can be about 2 to about 50 millimeters. In one embodiment, the spacing between the ribs can be about 3 to about 30 millimeters, and in another embodiment, the spacing between the ribs can be about 4 to about 25 millimeters. In yet another embodiment, the spacing between the ribs is about 5 to about 20 millimeters. The thickness of the individual components that make up the HMWS component, such as for example, the plastic sheets or the reinforcing ribs can be from 0.1 millimeter to about 16 mm.

When a HMWS is viewed in cross-section perpendicular to the direction of extrusion such that the longest side is in a horizontal orientation, one can see a series of horizontal layers between the top and bottom surfaces, and a series of vertically oriented ribs or reinforcing members. The vertically oriented ribs or reinforcing members run along the length of the HMWS and separate the horizontal layers. The vertically oriented ribs can comprise any combination of perpendicular ribs, diagonal ribs, or other angled ribs oriented at other angles with respect to the layers that they separate. When such an arrangement is viewed in cross section, the presence of variously shaped cells can be discerned.

In an embodiment, the number of perpendicular and diagonal reinforcing members or ribs can be modified depending upon the end-use application. Diagonal ribs can enhance the rigidity, measured for example, by the specific stiffness of the individual sheets in the perpendicular direction. Specific stiffness is given by the ratio of stiffness to the weight of the sheet.

The HMWS used for forming the HMWSC can have a notched Izod impact strength of greater than or equal to about 4 kilojoules/square meter in an embodiment, greater than or equal to about 6 kilojoules/square meter in another embodiment, and greater than or equal to about 8 kilojoules/square meter in still another embodiment.

The HMWSs can be produced by numerous techniques. The specifications applied to plastic sheets or films in a number of multi-wall sheet applications and optical applications in general can be rather stringent, including the requirements that the thermoplastic substrates should not form any bubbles or cavities when processed; they should display minimal optical birefringence; they should have a low thickness tolerance or variation, low curvature, low thermal shrinkage, and low surface roughness. Broadly speaking, the techniques can be divided into two main approaches. In the first approach, a two-step process is used, wherein the first step is the formation of the HMWS (hollow multi-wall sheet), that is, the HMWSC without the RTEEs. The HMWS can be formed by any of the methods generally known in the art for producing multi-wall sheets. In the second step, the RTEEs are then formed on a surface of the horizontal sheet by a suitable technique. In the second approach, the IMWS and the RTEEs are formed in a single step operation to form the HMWSC. These approaches are discussed in greater detail below.

The HMWS can be produced by melt blending the polymer feed material and other desired additives and then forming in a single step using devices such as single and twin-screw extruders, Buss kneaders, roll mills, Waring blenders, Henschel mixers, helicones, Banbury mixers, or the like, or combinations of the at least one of the foregoing melt blending devices. Linear production techniques, such as extrusion can be advantageously used since they can be implemented at lower cost. In one embodiment, the multi-wall sheet may be extruded in a single step using a profile die using a twin-screw extruder. The thermoplastic polymers, blend of thermoplastic polymers or a blend of thermoplastic polymers with a thermosetting polymer is generally fed to the throat of the extruder along with any other desired additive(s). The additives may also be fed to the extruder in masterbatch form.

In one embodiment related to the manufacturing of multi-wall sheets wherein the first and/or the second sheet comprise multiple layers, co-extrusion may be used to produce the multiwall sheet. Various techniques can be used to ensure formation of quality HMWSs, such as for example, those disclosed in commonly assigned U.S. Pat. No. 2,005,0112331A1, published on May 26, 2005. In one embodiment, in one manner of co-extruding of a multi-layered HMWS, the melt streams from the various extruders are fed into a feed block die where the various melt streams are combined before entering the die. In another embodiment, the melt streams from the various extruders are fed into a multi-manifold internal combining die. The different melt streams enter the die separately and join just inside the final die orifice. In yet another embodiment, the melt streams from the various extruders are fed into a multi-manifold external combining die. The external combining dies have completely separate manifolds for the different melt streams as well as distinct orifices through which the streams leave the die separately, joining just beyond the die exit. The layers are combined while still molten and just downstream of the die. An exemplary die used in the production of the multi-layered HMWS is a feed block die. In an exemplary embodiment, the extruders used for the co-extrusion of the multiwall sheet are single screw extruders respectively. The co-extruded sheet may optionally be calendared in a roll mill if desired.

Figure 1:
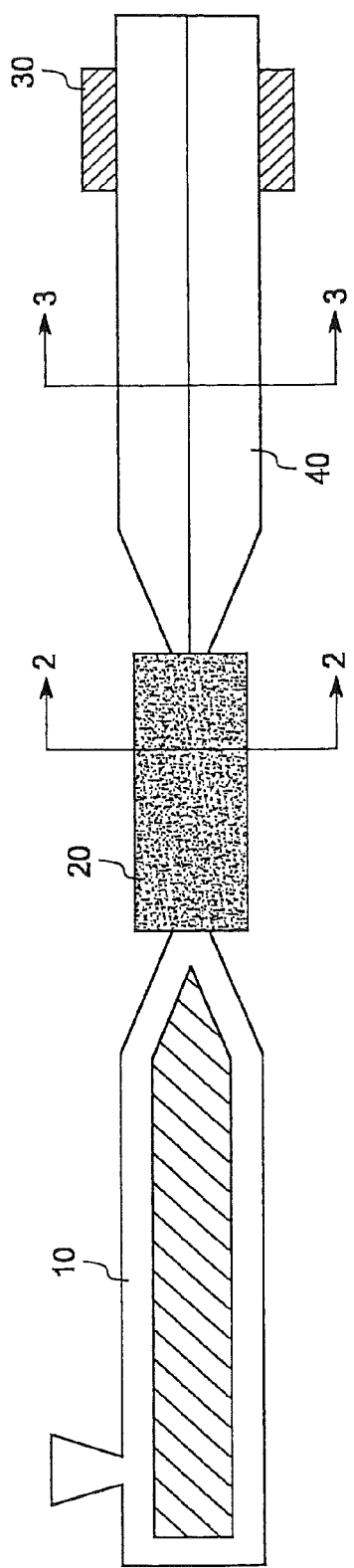
FIG. 1 represents a schematic for a 1-step linear production process comprising producing a hollow multi-wall structural component having a plurality of radiation transmission enhancing elements by using a die having multi-wall sheet features and features for producing the plurality of radiation transmission enhancing elements; by linear production process.
Figure 3:
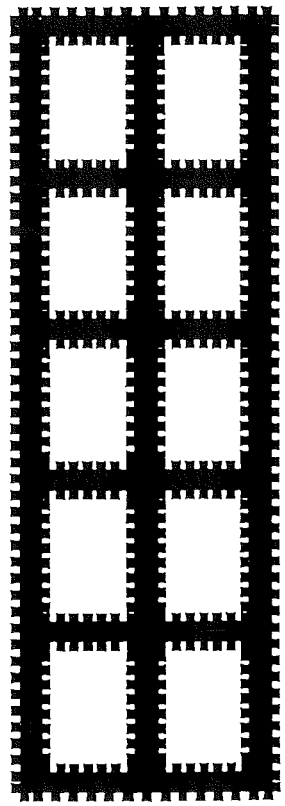
FIG. 3 represents a cross-sectional view along line 3-3 of the hollow multi-wall structural component of FIG. 1 in a direction perpendicular to the line of extrusion.
Figure 2:
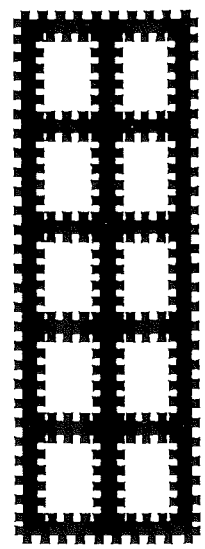
FIG. 2 represents a cross-sectional view along line 2-2 of the die of FIG. 1 in a direction perpendicular to the line of extrusion.

One aspect of a method for producing the HMWSSC is illustrated schematically in FIG. 1. A plastic feed material is fed into an extruder 10, which conveys the molten material to a die 20. The extruded material is then drawn by calibrator 30 to produce the HMWSC-1 40. The inner structural features of die 20 is shown in FIG. 2, wherein the rectangular-shaped cells create the structural features for the hollow multi-wall sheet, and the figure structures present on the outer and inner surfaces create the RTEEs in the HMWSC 40. FIG. 3 shows the detailed structure of the HMWSS 40. The relatively larger size of the HMWSC, as compared with the size of the die shown in FIG. 2, is due to die swell effects.

Figure 4:
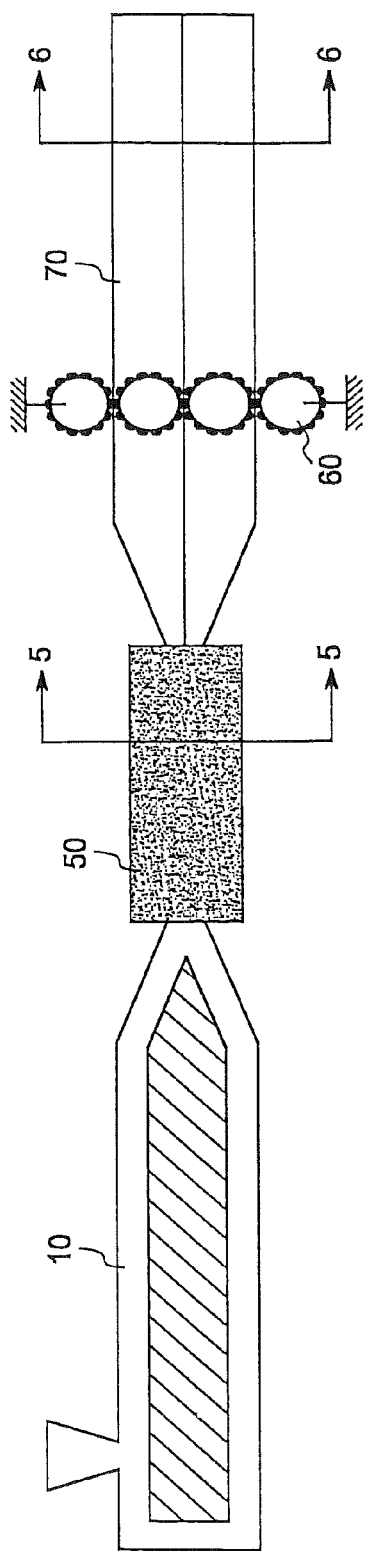
FIG. 4 represents a schematic for a 2-step process comprising forming a hollow multi-wall sheet using a die, and then embossing a plurality of radiation transmission enhancing elements on a plurality of surfaces of the hollow multi-wall sheet to produce a hollow multi-wall structural component having the plurality of radiation transmission enhancing elements.
Figure 6:
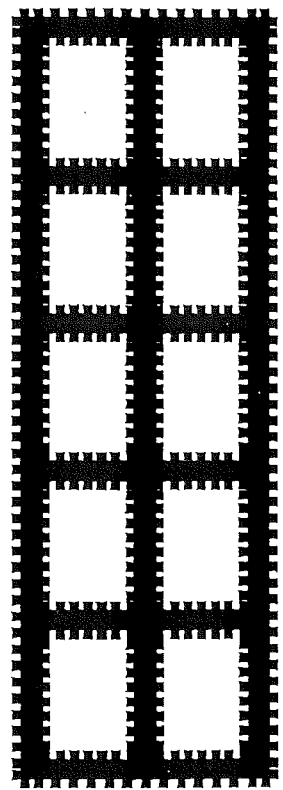
FIG. 6 represents a cross-sectional view along line 6-6 of the hollow multi-wall sheet structure of FIG. 4 in a direction perpendicular to the line of extrusion.
Figure 5:
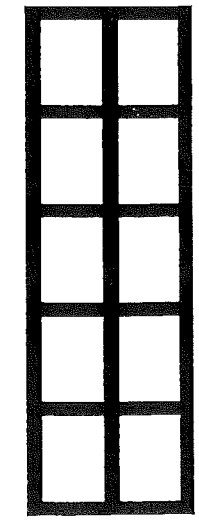
FIG. 5 represents a cross-sectional view along line 5-5 of the die of FIG. 4 in a direction perpendicular to the line of extrusion.

In another aspect of the method for producing the HMWSC, illustrated in FIG. 4, a plastic feed material is fed into an extruder 10, which conveys the molten material to a die 50, having a structure shown schematically in FIG. 5. A hollow multi-wall sheet is obtained as an extrudate, which then passes through a zone having a plurality of embossing rollers 60 to form HMWSC-2 70, whose structure is shown schematically in FIG. 6. The RTEEs are formed on the plastic surfaces that come in contact with the embosser. A variety of embossing techniques and a variety of embosser designs known in the art can be used to form the RTEEs. In principle, the embossing structures on the embosser can be of any size. In an embodiment, one or more embossing rollers can be employed depending upon the number of surfaces where the RTEEs have to be formed. Further, by suitably positioning the embossing rollers, the RTEEs can be formed on at least a portion of at least one surface of the hollow multi-wall sheet produced from die 50. In a particular embodiment, suitable embossers that can form RTEEs suitable for enhancing transmission of visible light can be used.

Figure 7:
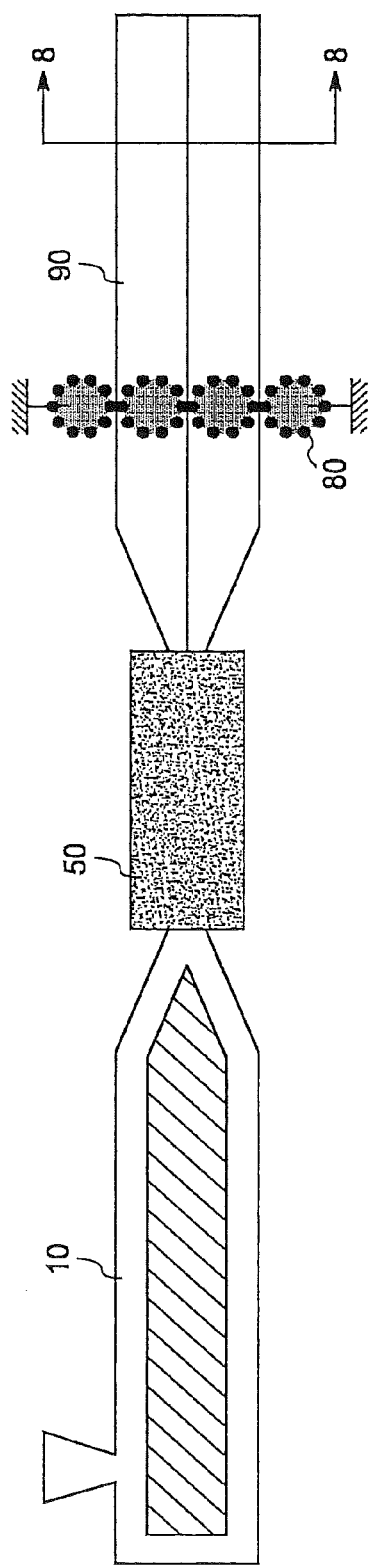
FIG. 7 represents a schematic for a 2-step process comprising forming a hollow multi-wall sheet using the die of FIG. 4, and then coating a plurality of radiation transmission enhancing elements on a plurality of surfaces of the hollow multi-wall sheet to produce a hollow multi-wall structural component having the plurality of radiation transmission enhancing elements.
Figure 8:
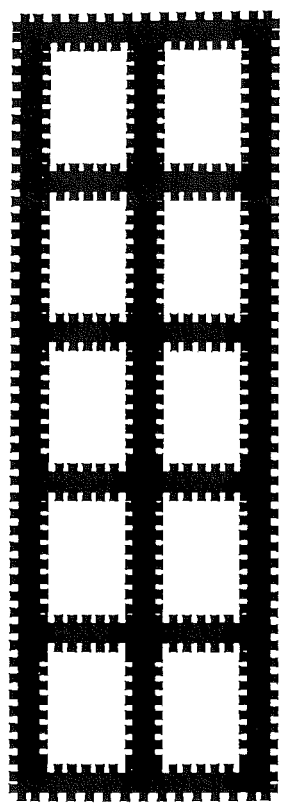
FIG. 8 represents a cross-sectional view along line 8-8 of the hollow multi-wall sheet structure of FIG. 7 in a direction perpendicular to the line of extrusion.

A still another aspect of a method for producing the HMWSC is illustrated in FIG. 7. The hollow multi-wall sheet extrudate produced using die 50, as described previously, is conveyed to a series of coating dispensers 80, which leads to formation of the RTEEs and the desired HMWSC-3 90. The structure of the HMWSC-3 is shown in FIG. 8. The coating dispensers can in principle be configured to dispense a coating having a wide range of thickness that spans the entire size domain of the RTEEs. In a particular embodiment, suitable coating dispensers that can deposit RTEEs suitable for enhancing transmission of visible light can be used. A variety of techniques and coating dispenser structures and configurations known in the art can be used.

In a still yet another aspect of the method for producing the HMWSC, illustrated in FIG. 9, the hollow multi-wall sheet extrudate produced using die 50 is conveyed to an engraving radiation beam optical assembly 100. Using a variety of optical beam-shaping, beam-splitting and beam-refocusing techniques, a laser beam of an appropriate energy can be precisely aimed at targeted areas of the plastic surface of the hollow multi-wall sheet surfaces, thereby producing the HMWSC-4 110 having RTEEs. In one embodiment of the laser engraving technique, more than one laser radiation source can be used to ensure engraving of the RTEEs without damaging the other parts of the HMWSC. FIG. 10 shows the schematic structure of HMWSC-4 110. In one aspect, the laser forms the RTEEs by ablating the plastic material off the surface. The duration of laser irradiation at a given site on the surface, the intensity of the laser radiation at a given site, and the width of the laser beam are some of the parameters that can be varied over a wide range, and further, independently of each other, to produce RTEEs having a wide variety of structural profiles.

When preparing the HMWS, it is generally observed that the HMWS exiting the extruder must maintain the complicated shape of the die until the resin cools below its softening temperature. To ensure that the multiwall sheet does not collapse before cooling, a polycarbonate resin having a high melt strength (measured for example from its extensional viscosity) may be used. Polycarbonates having a high melt strength can be obtained by using branched polycarbonates prepared by introducing branching agents (generally trihydric phenols) during the formation of the polycarbonates. They may also be obtained by employing melt polymerization conditions under which a controlled amount of Fries rearrangement product is generated, thereby generating a branching structure on the polcarbonate backbone and leading to an increased melt strength, as disclosed in commonly assigned Patent Application No. U.S. Pat. No. 2,003,0214070A1, published on Nov. 20, 2003, and herein incorporated in its entirety.

Other methods for forming the RTEEs, especially RTEEs having a size in a range of 100 nanometers to 500 nanometers include various types of photolithographic techniques where radiation of decreasing wavelengths, such as mercury lamp, KrF excimer laser, ArF excimer laser, $F_2$ excimer laser, dimer discharge from an argon laser, and the like can be used. Soft lithography is another recently developed technique that can be used, especially for producing RTEEs having a dimension of 100 nanometers or less. Several other techniques known in the art for patterning microstructures and nanostructures, such as those disclosed by Matthias Geissler and Younan Xia in "Patterning Principles and Some New Developments", Advanced Materials, 2004, 16, No. 15, pp. 1249-1269, can also be used. In an embodiment, the RTEEs on at least a portion of one surface of at least one of the plurality of sheets of the hollow multi-wall sheet produced in the extrusion step can be formed by a laser etching technique, a calendaring technique, a lithography technique, a self-assembly technique, an embossing technique, an injection molding technique, or an imprinting technique.

The proof of concept for illustrating the radiation transmission enhancing capability of the RTEEs in a HMWSC can be provided using wave optics simulation software, such as, for example, the commercially available software Gsolver® or PCGrate® (available from International Intellectual Group), which can accurately predict grating efficiencies for a wide range of wavelengths in the electromagnetic spectrum and for a wide variety of RTEE structures. Further, the software can be used to simulate the effect of the diffractive features of the RTEEs on radiation transmission. The grating efficiency calculation requires solutions to vector formulation of electromagnetic theory, i.e., Maxwell's Equation. The simulation methodology and the theoretical background are known (See for example, Leonid I. Goray and John F. Seely in "Efficiencies of Master, Replica, and Multilayer Gratings For The Soft-X-ray-Extreme-Ultraviolet Range: Modeling Based on the Modified Integral Method and Comparisons with Measurements", Applied Optics, Volume 41, (2002), No. 7, pp. 1434-1445). For example, the energy distribution in an optical grating depends on the wavelength of the incident light, angle of incidence and diffraction, refractive index of the grating, and the groove geometry of the RTEEs.

The numerical simulation results show that the transmission of light through a transparent surface having diffractive structural features (RTEEs), example, lamellar type ridges of 0.3 micrometer width and 0.5 micrometer depth, or triangular features of 1-micrometer width and 0.25 micrometer depth is increased by around 8% as compared with a flat transparent surface that does not have the RTEEs. This increase in transmission is observed over the entire wavelength range (200 nanometers to 700 nanometers) of visible light, and furthermore for all angles of incidence from 0-180 degrees.

The numerical simulation data for a transparent surface having lamellar-shaped RTEEs, triangular-shaped RTEEs, or no RTEEs for incident visible light are shown in Tables 1-6.

Table 1 shows the effect of the angle of incidence and depth of triangular-shaped RTEEs on the amount of transmitted light at a fixed wavelength of 500 nm for the incident light. The energy of the incident light is assumed to be 100. The triangular RTEEs are situated on a transparent surface and have a grating frequency of 1000 gratings per millimeter. The abbreviation "nm" stands for nanometers.

Table 2 shows the dependence of the angle of incidence on the amount of transmitted light for a transparent surface having triangular-shaped RTEEs of 400 nm depth and a grating frequency of 1000 gratings per millimeter.

Table 3 shows the dependence of the angle of incidence on the amount of transmitted light for a transparent surface having lamellar-shaped RTEEs of 500 nm depth, 300 nm groove width, and a grating frequency of 2000 gratings per millimeter.

Table 4 shows the dependence of the transmitted light as a function of the wavelength of the incident light for a transparent surface having no RTEEs. The angle of incidence is maintained at 0°.

Table 5 shows the effect of the optimized size of the triangular-shaped and the lamellar-shaped RTEEs in enhancing the amount of transmitted light. The incident light has a wavelength is 200-800 nm and normal angle of incidence. The optimized triangular-shaped RTEE has a depth of 400 nanometers, and the optimized lamellar-shaped RTEEs have a groove depth of 500 nanometers and a ridge width of 300 nanometers.

The results of Table 1 are illustrated more clearly in FIG. 12 which shows that with light having a wavelength of 500 nanometers, the triangular RTEEs give significantly higher percent light transmittance over all angles of incidence between 0 degree and about 80 degrees.

TABLE 1

| Angle of incidence (°) | Amount of the transmitted light (%) as a function of the depth of the triangular-shaped RTEEs (nm) | | | |
| --- | --- | --- | --- | --- |
| | 400 | 300 | 200 | 100 |
| 0 | 97.9356 | 96.0769 | 95.1772 | 94.9718 |
| 11.25 | 98.2479 | 96.5513 | 95.3842 | 94.9898 |
| 22.5 | 96.9475 | 96.1607 | 95.317 | 94.9121 |
| 33.75 | 96.2251 | 95.2928 | 94.8647 | 94.664 |
| 45 | 96.0028 | 95.9386 | 95.3146 | 94.3396 |
| 56.2499 | 94.4169 | 94.3797 | 93.4694 | 92.0974 |
| 67.4999 | 90.243 | 89.6541 | 87.7225 | 85.4398 |
| 78.7499 | 75.2818 | 72.5727 | 68.6826 | 65.3765 |
| 89.9999 | 0.0014 | 0.0013 | 0.0011 | 0.001 |

TABLE 2

| Angle of Incidence (°) | Amount of transmitted light (%) as a function of incident light wavelength (nm) | | | | |
| --- | --- | --- | --- | --- | --- |
| | 280 | 310 | 340 | 370 | 400 |
| 0 | 98.0736 | 97.1684 | 99.0463 | 98.3622 | 97.9356 |
| 11.25 | 97.465 | 98.1101 | 97.3002 | 96.894 | 98.2479 |
| 22.5 | 96.6731 | 96.8444 | 97.0544 | 97.092 | 96.9475 |
| 33.75 | 96.233 | 96.0542 | 95.905 | 96.1845 | 96.2251 |
| 45 | 95.1071 | 96.2432 | 96.2188 | 96.1866 | 96.0028 |
| 56.2499 | 94.4351 | 94.6749 | 94.2825 | 94.2553 | 94.4169 |
| 67.4999 | 90.6852 | 89.949 | 90.3136 | 90.2331 | 90.243 |
| 78.7499 | 75.8076 | 75.6481 | 75.8415 | 75.298 | 75.2818 |
| 89.9999 | 0.0014 | 0.0015 | 0.0014 | 0.0014 | 0.0014 |

TABLE 3

| Angle of incidence (°) | Amount of the transmitted light (%) as a function of the depth of the lamellar-shaped RTEEs (nm) | | | |
| --- | --- | --- | --- | --- |
| | 500 | 375 | 250 | 125 |
| 0.00 | 96.23 | 96.32 | 96.60 | 96.66 |
| 11.25 | 96.69 | 96.79 | 96.69 | 96.54 |
| 22.50 | 96.41 | 96.35 | 96.73 | 96.37 |
| 33.75 | 96.26 | 95.46 | 96.07 | 95.58 |
| 45.00 | 95.34 | 95.84 | 96.01 | 94.83 |
| 56.25 | 94.21 | 90.99 | 93.16 | 95.16 |
| 67.50 | 86.02 | 89.20 | 87.90 | 87.87 |
| 78.75 | 65.59 | 67.35 | 66.41 | 67.12 |
| 90.00 | 0.00 | 0.00 | 0.00 | 0.00 |

TABLE 4

| Wavelength of incident light (nm) | Amount of transmitted light (%) as a function of incident light |
| --- | --- |
| 200 | 96.3178 |
| 400 | 97.8954 |
| 600 | 97.4591 |
| 800 | 97.1397 |

TABLE 5

| Shape of RTEEs | Amount of transmitted light (%) as a function of shape of RTEEs at various incident light wavelengths (nm) | | | | Average amount (%) of light transmitted | Enhancement of light transmission |
| --- | --- | --- | --- | --- | --- | --- |
| | 200 | 400 | 600 | 800 | over 200-800 nm | (%) |
| None (flat) | 89.9 | 89.9 | 89.9 | 89.9 | 89.9 | 0 |
| Lamellar | 96.3178 | 97.8954 | 97.4591 | 97.1397 | 97.203 | 7.303 |
| Triangular | 99.3227 | 98.778 | 99.5005 | 99.6528 | 99.3135 | 9.4135 |

The results of Table 5 are illustrated graphically in FIG. 13, which shows that over a wavelength range of 200-800 nanometers, the percent light transmittance with the optimized triangular-shaped RTEEs is greater than with the optimized lamellar-shaped RTEEs, which in turn is greater than that of a surface having no RTEEs. Further, the data in Table 5 shows with incident radiation having a wavelength of 200 nanometers to 800 nanometers and at normal angle of incidence, the optimized lamellar-shaped RTEEs give a 7.3 percent enhancement in the amount of transmitted light, relative to the case where no RTEEs are present on the surface. However, the triangular-shaped RTEEs give a still higher enhancement in the amount of transmitted light of 9.4 percent, relative to the case where no RTEEs are present on the surface. Further, when a HMWSC having two or more spaced-apart sheets is used, wherein each sheet has a plurality of the RTEEs, the amount of radiation transmitted through the HMWSC can be enhanced appreciably, while retaining the structural strength of a hollow multi-wall sheet structure, as compared with a HMWSC that does not have any RTEEs on any of the sheets. The amount of light transmitted for a triple wall sheet structure component is significantly higher as at every interface in a HMWSC without RTEEs, there will around 8% of light lost to reflection. Hence the overall transmission at all interfaces is enhanced. The total transmission of a triple wall MWS will be around 98% for a HMWSC having RTEEs on all surfaces, as compared to 72.9% for a HMWSC that does not have the RTEEs. The modeling results obtained herein illustrate that by leveraging diffractive wave effects, the transmission of light through a transparent surface can be increased to about 99 percent of theory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A hollow multi-wall structural component comprising a plurality of spaced-apart sheets that transmit an incident radiation, and connected with reinforcing members; wherein at least a portion of one surface of at least one of the sheets comprises a plurality of radiation transmission-enhancing elements, wherein a size of the radiation transmission-enhancing elements is 0.2 to 1.25 times a wavelength of at least a part of the incident radiation, wherein the incident radiation comprises a wavelength of 200 to 800 nanometers.

2. The hollow multi-wall structural component of claim 1, wherein the reinforcing members comprise perpendicular ribs, angled ribs, or combination thereof extending the length of the sheet.

3. The hollow multi-wall structural component of claim 2, wherein the reinforcing members separate the sheets from each other.

4. The hollow multi-wall structural component of claim 1, wherein the radiation transmission-enhancing elements have a spacing periodicity, or an aspect ratio that is between 0.1 times to 100 times the wavelength of at least a part of the incident radiation.

5. The hollow multi-wall structural component of claim 1, wherein the radiation transmission-enhancing elements comprise at least one set of lamellar-shaped elements, triangular-shaped elements, pyramidal-shaped elements, trapezoidal-shaped elements, saw tooth-shaped elements, sinusoidal-shaped elements, abs(sin)-shaped elements, cycloid-shaped elements, cylindrical-shaped elements, conical-shaped elements, or cubical-shaped elements.

6. The hollow multi-wall structural component of claim 5, wherein the radiation transmission-enhancing elements are present in randomized arrays, quasi-periodic arrays, or randomized quasi-periodic arrays.

7. The hollow multi-wall structural component of claim 1, wherein the sheets and the reinforcing members independently comprise transparent material comprising a plastic, a glass, a ceramic, a transparent metal or silicon.

8. An article comprising the hollow multi-wall structural component of claim 1.

9. A glazing structure comprising a hollow multi-wall structural component, said component comprising a plurality of spaced-apart plastic sheets that transmit visible light, and bonded with reinforcing members; wherein at least one surface of at least one of the sheets comprises a plurality of radiation transmission-enhancing nano-structured elements, wherein a size of the radiation transmission-enhancing elements is 0.2 to 1.25 times a wavelength of at least a part of the incident radiation, wherein the incident radiation comprises a wavelength of 200 to 800 nanometers.

10. The glazing structure of claim 9, wherein the radiation transmission-enhancing nano-structured elements have a depth from about 100 nanometers to about 1000 nanometers.

11. The glazing structure of claim 9, wherein the radiation transmission-enhancing nano-structured elements have a depth from about 200 nanometers to about 800 nanometers.

12. The glazing structure of claim 9, wherein the radiation transmission-enhancing nano-structured elements on the at least one surface of the at least one of the sheets are spaced apart from each other at a distance from about 100 nanometers to about 1000 nanometers.

13. The glazing structure of claim 9, wherein the hollow multi-wall structural component has a thickness from about 5 millimeters to about 100 millimeters.

14. The glazing structure of claim 9, wherein the plastic sheets independently have a thickness from about 0.1 millimeter to about 16 millimeters.

15. The glazing structure of claim 9, wherein the reinforcing members comprise perpendicular and angled ribs separating the sheets.

16. A method of increasing radiation transmission through a hollow multi-wall structural component, the method comprising:
    forming radiation transmission-enhancing structures on at least a portion of one surface of at least one of a plurality of spaced-apart sheets of a hollow multi-wall sheet structure; wherein the sheets are connected with reinforcing members, wherein a size of the radiation transmission enhancing elements is 0.2 to 1.25 times a wavelength of at least a part of the incident radation, wherein the incident radiation comprises a wavelenght of 200 to 800 nanometers.

17. The method of claim 16, wherein said forming radiation transmission-enhancing structures on at least a portion of one surface of at least one of the plurality of sheets is implemented by a laser etching technique, a calendaring technique, a lithography technique, a self-assembly technique, an embossing technique, an injection molding technique, or an imprinting technique.

18. The hollow multi-wall structural component of claim 1, wherein the radiation transmission-enhancing elements have a size that is less than or equal to the average wavelength of at least a part of the incident radiation, wherein the radiation transmission-enhancing elements comprise at least one set of lamellar-shaped elements, triangular-shaped elements, pyramidal-shaped elements, trapezoidal-shaped elements, saw tooth-shaped elements, sinusoidal-shaped elements, abs (sin)-shaped elements, cycloid-shaped elements, cylindrical-shaped elements, conical-shaped elements, or cubical-shaped elements.

19. The hollow multi-wall structural component of claim 18, wherein the radiation transmission-enhancing elements have a spacing periodicity that is less than or equal to the average wavelength of at least a part of the incident radiation.

20. The hollow multi-wall structural component of claim 1, wherein the radiation transmission-enhancing elements have a spacing periodicity that is less than or equal to the average wavelength of at least a part of the incident radiation.

21. The hollow multi-wall structural component of claim 1, wherein a size of the radiation transmission-enhancing elements is 0.35 to 1.2 times a wavelength of at least a part of the incident radiation.

22. A hollow multi-wall structural component, comprising:
a plurality of spaced-apart sheets that transmit an incident radiation, and connected with reinforcing members;
wherein at least a portion of one surface of at least one of the sheets comprises a plurality of radiation transmission-enhancing elements;
wherein a size of the radiation transmission-enhancing elements is less than or equal to a wavelength of at least a part of the incident radiation, wherein the incident radiation comprises a wavelength of 200 to 800 nanometers;
wherein the radiation transmission-enhancing elements comprise at least one set of lamellar-shaped elements, triangular-shaped elements, pyramidal-shaped elements, trapezoidal-shaped elements, saw tooth-shaped elements, sinusoidal-shaped elements, abs(sin)-shaped elements, cycloid-shaped elements, cylindrical-shaped elements, conical-shaped elements, or cubical-shaped elements.

23. A hollow multi-wall structural component comprising a plurality of spaced-apart sheets that transmit an incident radiation, and connected with reinforcing members; wherein at least a portion of one surface of at least one of the sheets comprises a plurality of radiation transmission-enhancing elements, wherein a size of the radiation transmission-enhancing elements is less than or equal to 1.25 times a wavelength of at least a part of the incident radiation, wherein the incident radiation comprises one or more radiation wavelengths in the visible, infrared, or microwave range.

24. The hollow multi-wall structural component of claim 22, wherein the size of the radiation transmission-enhancing elements is 0.2 to 1.25 times a wavelength of at least a part of the incident radiation.

25. The hollow multi-wall structural component of claim 23, wherein the incident radiation comprises a wavelength of 200 to 800 nanometers.

26. The hollow multi-wall structural component of claim 1, wherein the incident radiation comprises a wavelength of 200 to 700 nanometers.

* * * * *